United States Patent [19]

Anderson et al.

[11] Patent Number: 4,549,405
[45] Date of Patent: Oct. 29, 1985

[54] MODULAR AIR CONDITIONING UNIT FOR MOBILE CARGO CONTAINER

[75] Inventors: Gordon K. Anderson, Tustin; William S. Savage, LaMirada, both of Calif.

[73] Assignee: Carrier Corporation, Syracuse, N.Y.

[21] Appl. No.: 560,719

[22] Filed: Dec. 12, 1983

[51] Int. Cl.⁴ ............................................... B60H 3/04
[52] U.S. Cl. ........................................ 62/239; 62/298; 62/448; 62/285
[58] Field of Search ................ 62/239, 298, 407, 418, 62/419, 426, 448, 285; 165/76

[56] References Cited

U.S. PATENT DOCUMENTS

| | | | |
|---|---|---|---|
| 3,712,078 | 1/1973 | Maynard et al. | 62/298 X |
| 3,742,725 | 7/1973 | Berger | 165/76 X |
| 3,823,770 | 7/1974 | Duell et al. | 165/76 |
| 3,918,271 | 11/1975 | Whisler | 62/239 X |
| 3,977,467 | 8/1976 | Northrup, Jr. | 165/76 X |
| 4,129,013 | 12/1978 | Hine, Jr. | 165/76 X |
| 4,169,500 | 10/1979 | Braver | 165/76 X |
| 4,337,823 | 7/1982 | Del Percio | 165/76 X |
| 4,402,191 | 9/1983 | King | 62/239 |
| 4,441,333 | 4/1984 | Mayer | 62/239 |
| 4,449,376 | 5/1984 | Draper et al. | 62/298 X |
| 4,457,140 | 7/1984 | Rastelli | 62/298 X |

Primary Examiner—William E. Tapolcai
Attorney, Agent, or Firm—David J. Zobkiw

[57] ABSTRACT

A modular air conditioner package for circulating conditioned air within a transportable cargo container. The package includes a standard fan deck and evaporator unit that can be selectively mated inside the container along either the front or the top wall in a blow through or draw through configuration. The fan deck is mounted at the top front corner of the container and can be joined to the evaporator unit to provide four separate options for directing conditioned air downwardly along the front wall or rearwardly along the top wall of the container depending on the type of load being transported.

4 Claims, 8 Drawing Figures

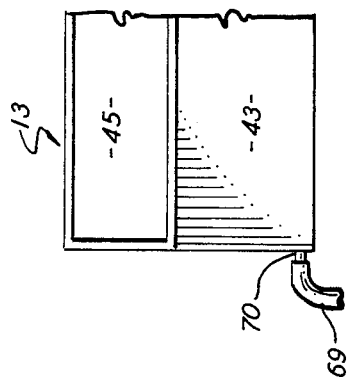
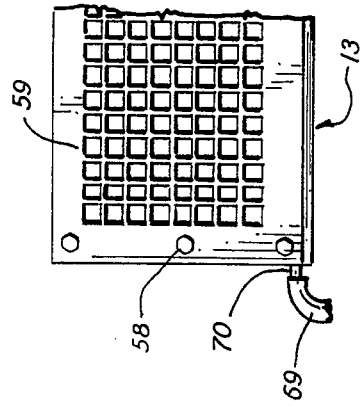
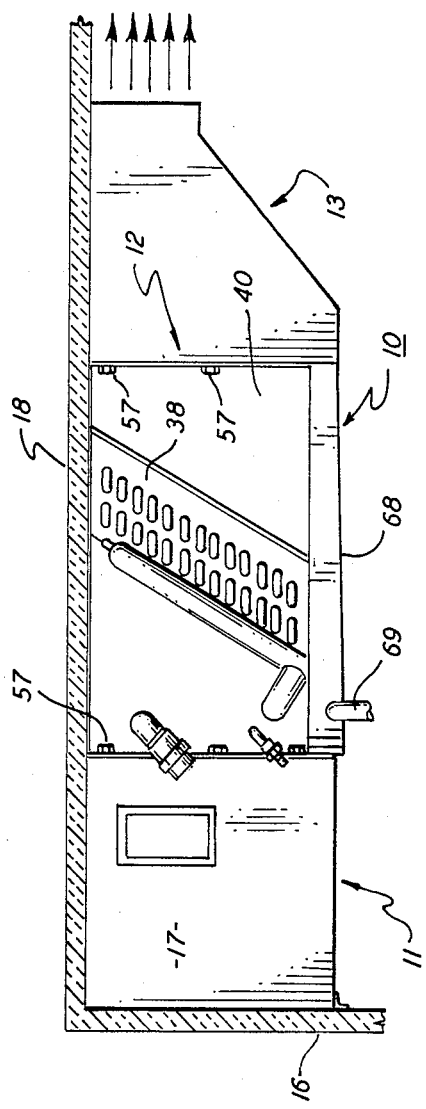
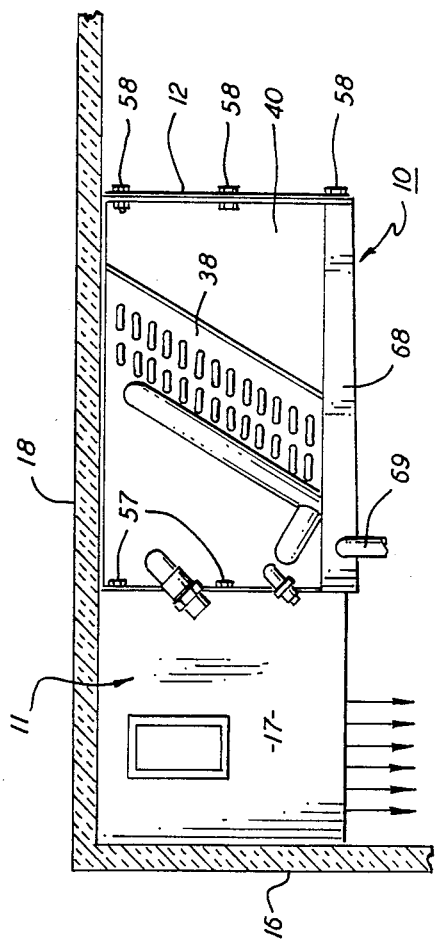

MODULAR AIR CONDITIONING UNIT FOR MOBILE CARGO CONTAINER

BACKGROUND OF THE INVENTION

This invention relates generally to a mobile cargo container for transporting goods in an air conditioned environment and, in particular, to a modular air handling package for circulating conditioned air within such a container.

The mounting of air conditioning equipment inside a mobile container is an important consideration when attempting to maximize the load carrying capacity of the unit. Depending on the type of load normally carried, the air conditioning equipment will be either wall mounted along the front wall of the container or top mounted along the ceiling of the container. Although modular units have been devised for use in containers, these units are all limited to draw through applications wherein the blower is orientated in reference to the evaporator coil so that circulating air is drawn by the blower over the cooling surfaces of the coil. Accordingly, the number of different configurations that can be generated with draw through equipment is extremely limited.

One advantage of the draw through configuration lies in the fact that the fan deck can be arranged so that the blower will discharge conditioned air into a restricted flow zone immediately adjacent to either the front wall or top wall of the container thus minimizing the valuable cargo space needed for circulation. In light of the fact that an evaporator coil of any suitable capacity is quite a bit larger in width than the desired flow path between the container walls and the cargo, blow through applications have heretofore generally been avoided.

The handling of evaporator condensate in some blow through configurations, particularly where the coil hangs below the fan, can also be a problem.

SUMMARY OF THE INVENTION

It is therefore an object of the present invention to improve air conditioning equipment used in mobile containers for transporting various types of goods.

It is a further object of the present invention to provide modular air conditioning equipment for internal use in a mobile container that can be adapted for either draw through or blow through applications without sacrificing valuable cargo space.

A still further object of the present invention is to provide a modular air conditioning system for internal use in a container for transporting various goods that can be selectively arranged into four different configurations.

Yet another object of the present invention is to provide a modular air conditioning package for use in a mobile cargo container that can be mounted internally along either the front wall or the top wall of the container in either a draw through or a blow through configuration to circulate the conditioned air along a narrow flow path immediately adjacent to one of the walls.

Another object of the present invention is to greatly expand the usefulness of modular air conditioning packages used in mobile cargo containers while at the same time facilitating the handling of evaporator condensate without having to unduly sacrifice valuable cargo space.

These and other objects of the present invention are attained by means of a modular air conditioning package for internal mounting within a mobile cargo container that includes a fan deck capable of being fitted into the top front corner of the container an evaporator coil unit that can be universally attached to the fan deck to either blow circulating air over the coil surfaces or draw the air thereover and a converging air duct that can be also universally attached to either the fan deck or the evaporator unit when the equipment is used in certain applications to direct the conditioned air discharge charge from the package into a narrow flow path adjacent to one of the container walls.

BRIEF DESCRIPTION OF THE DRAWINGS

For a better understanding of these and other objects of the present invention reference is had to the following detailed description of the invention which is to be read in conjunction with the accompanying drawings wherein:

FIG. 5 is a side elevation showing the present modular package mounted along the ceiling of the cargo container in a blow through configuration for directing air along the top wall of the container;

FIG. 6 is a partial end view of the package shown in FIG. 5;

FIG. 7 is a side elevation showing the present modular package mounted along the ceiling of the cargo container in a draw through configuration for directing air along the front wall of the container; and FIG. 8 is also a partial end view of the package shown in FIG. 7.

DESCRIPTION OF THE INVENTION

Figure 2:
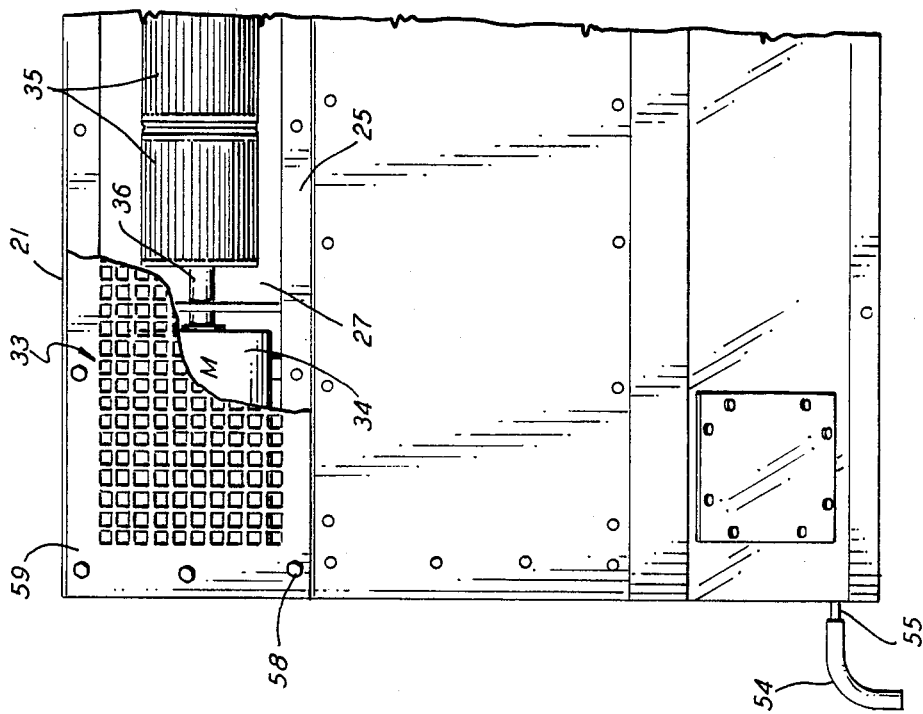
FIG. 2 is a partial front elevation of the modular package shown in FIG. 1.
Figure 1:
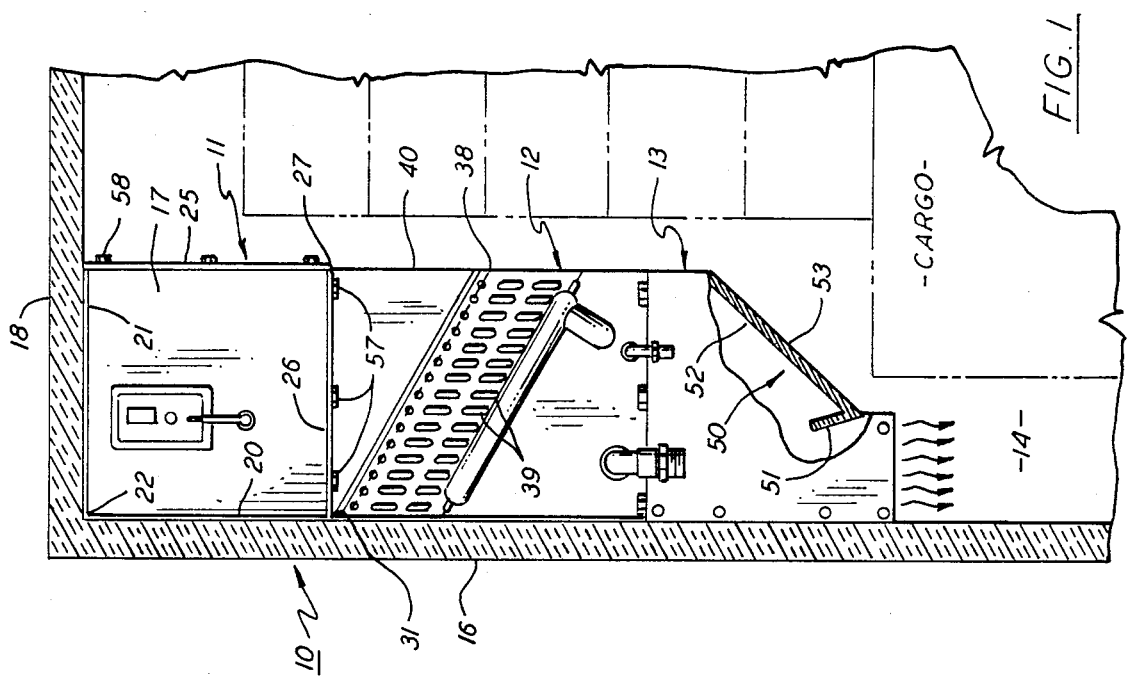
FIG. 1 is a side elevation of a modular air conditioning package embodying the teachings of the present invention showing the package mounted against the inside front wall of a mobile cargo container in a blow through configuration for directing conditioned air downwardly along the front wall of the container.

Turning initially to FIGS. 1 and 2, there is illustrated a modular air conditioning package that is adapted to be mounted inside a mobile cargo container such as the trailer section of a truck. Generally in this type of mobile application, only the evaporator coil of the air conditioning unit is housed within the container with the remainder of the air conditioning equipment being externally mounted so as to save cargo space and to permit the condenser to discharge directly into the atmosphere. Although not shown, it should be understood that refrigerant from the system is circulated through the internally contained evaporator coil to provide cooling to air moving over the coil surfaces. The modular package, which is herein referenced 10, is made up of three major sections that include a fan deck 11, a evaporator unit 12 and a combination flow director and condensate collector 13. Each section is a selfcontained unit and the units are universally interchangeable so that they can be assembled, as will be described in greater detail below, in various configurations to accommodate different types of cargo loading.

As previously noted, it is important to maintain circulation of the conditioned air within the container. In order to save valuable cargo space, while at the same time providing a flow path for the conditioned air that is leaving the present apparatus, a relatively narrow space 14 is furnished between the stacked cargo 15 and the container walls to establish a circulation zone through which conditioned air moves. To maximize the movement of conditioned air throughout the container, it is also advantageous to position the outlet of the modularized unit over the circulation flow path and to maintain the width of the air outlet opening about equal to the width of the flow path. The width of the circulation flow path may vary with different applications but typically it extends about six inches from the wall to the cargo. It should be further noted that, depending upon the type of cargo and the manner of loading, it may be further advantageous to mount the air conditioning equipment either along the front wall or the top wall of the container. Accordingly, one of four different interior configurations might be called for to meet the loading and flow circulating requirements. These include:

1. Top wall mounted equipment with a downwardly directed conditioned air flow.
2. Top wall mounted equipment with a rearwardly directed conditioned air flow.
3. Front wall mounted equipment with a downwardly directed conditioned air flow.
4. Front wall mounted equipment with a rearwardly directed conditioned air flow.

As will become evident from the disclosure below, the modular unit of the present invention is capable of being arranged to satisfy each of these conditions without having to carry out any major modification of the equipment.

As illustrated in FIGS. 1 and 2, the instant modular unit is shown mounted along the front wall 16 of the container and is adapted to direct conditioned air downwardly along the front wall of the container as indicated by the arrows. The fan deck 11 includes a rectangular housing 17 that is adapted to fit snuggly into the top front interior corner of the container formed by the intersection of the container top wall 18 and front wall 16. The housing includes two adjacent blank side walls 20 and 21 that coact to form a locating corner 22 which complements the top front corner of the container. In assembly, the two adjourning blank side walls are seated in contact against the top and front walls of the container and may be secured thereto by any suitable means.

Figures 3, 4:
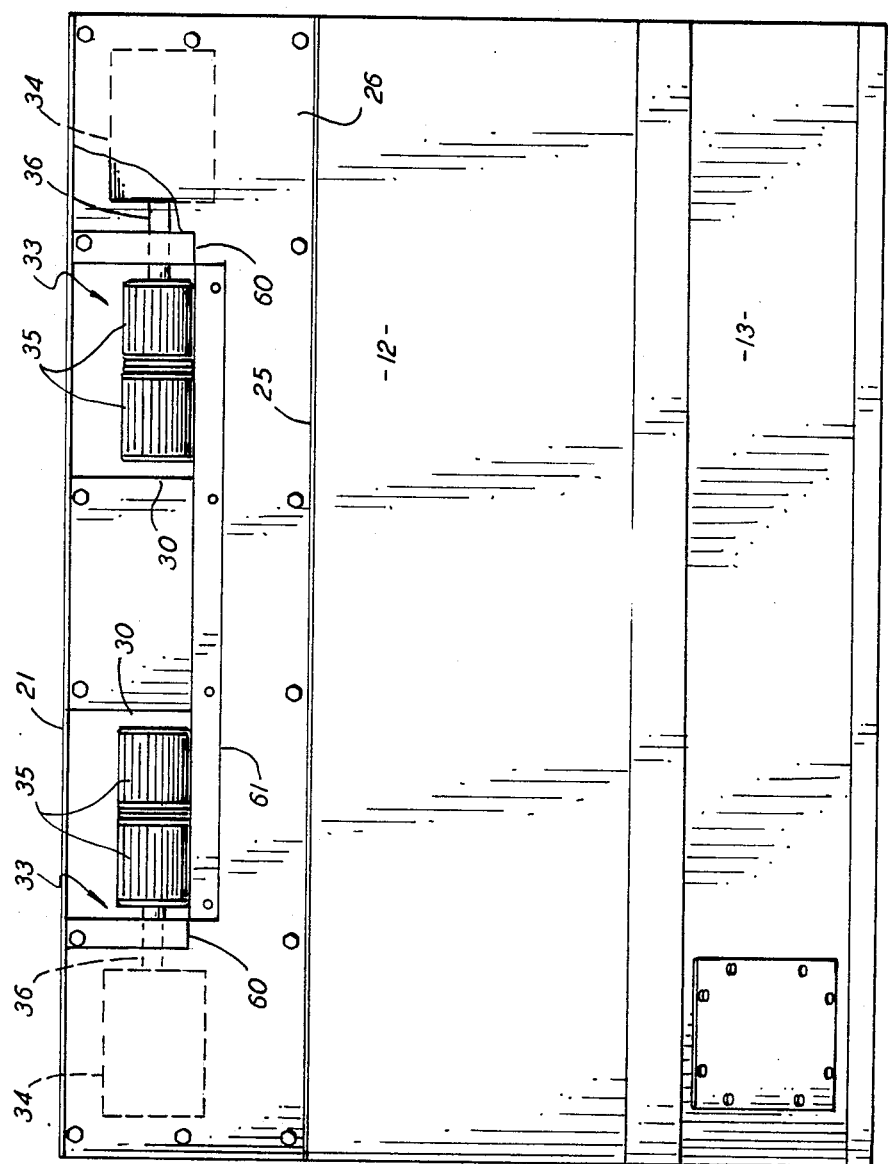
FIG. 3 is a side view of the present modular package again mounted on the front wall of the container but in a draw through configuration for directing conditioned air rearwardly along the top wall of the container.
FIG. 4 is a front elevation of the package shown in FIG. 3 with a portion broken away to show the blower motor.

The housing also includes a pair of adjacent exposed side walls 25 and 26 that coact to form corner 27 that is positioned diagonally across from the above noted locating corner 22. Side wall 26 contains a laterally disposed air inlet opening 28 that furnishes a generous air entrance into the fan deck housing. The second exposed side wall 25, as best shown in FIG. 4, contains a pair of laterally aligned restricted air outlets 30—30 through which air brought into the housing is discharged into the container. Air outlet openings are located adjacent to the corner 31 of the housing formed between blank side wall 20 and the exposed side wall 25. The air outlet openings is disposed laterally from the corner 31 is a sufficient distance across the exit wall of the housing so that the width of the opening substantially equal to the width of the flow zone 14 maintained between the cargo and the front wall 16 of the container (FIG. 1).

Two motor driven squirrel cage blower assemblies 33—33 are mounted within the fan deck housing. Each assembly has its own drive motor 34 that is coupled to a pair of squirrel cage impellers 35—35 by means of a shaft 36 (FIG. 4). The impellers are positioned within the housing so that they will direct conditioned air through the air outlet openings.

The configuration shown in FIG. 1 illustrates the modular equipment mounted upon the front wall of the container with the conditioned air being discharged downwardly along the front wall. The fan deck is adapted to draw air into the housing along the top wall of the container and to blow the air downwardly through the evaporator unit 12. The evaporator unit includes an inclined fin pack 38 having a series of slanted tube rows that are interconnected by means of return bends 39—39. A transition piece 40, is used to connect the fin pack and the air exhaust face of the fin pack housing which is described by side wall 26. The transition piece coacts with the evaporator coil to bring the unit 12 in a hollow rectangular form. Both ends of the rectangular unit are open to permit air to pass freely therethrough. The component parts of the evaporator coil, other than the fin pack cooling surfaces, are generally located to one side of the unit in any suitable arrangement that will not restrict the flow of air over the fins. The exact location and arrangement of these parts is not material to the present invention and these components may be situated where they are readily accessible for ease of assembly and maintenance.

The flow director 13 is secured directly beneath the evaporator unit and serves to gather the conditioned air that has passed through the evaporator unit and direct the air into the circulating flow path 14 between the cargo and front wall 15. The flow director is a hollow duct that complements the cross sectional configuration of the evaporator unit at its proximal end 42. The lower section 43 of the front wall of the duct is slanted inwardly to form a more restricted opening 45 at the distal end of the duct that serves as a discharge port for the unit. The width of the discharge port is substantially equal to that of the circulating flow path 14 whereby conditioned air is caused to pass efficiently into said flow path through the director.

As best seen in FIG. 1, a drain pan 50 is secured to the slanted lower section 43 of the flow director duct and extends across the entire length of the duct for collecting condensate falling from the evaporator coil. In assembly, the drain has an upraised leg 51 that coacts with a base plate 52 to direct the collected condensate into a drop line 54 through means of a connector 55 so that the condensate can be conveniently carried out of the container. As can be seen, the flow director serves two distinct functions in this embodiment of the invention. First, it effectively directs air blown over the evaporator surfaces along the front wall of the container and secondly it helps collect and remove condensate from the unit.

Turning once again to FIG. 1, each of the three major sections 11-13 making up the present unit are connected together by threaded fasteners in the form of screws 57—57. The screws are adapted to pass through holes formed in the top and bottom surfaces of the evaporator coil unit that surround the unit openings and are threaded into tapped receiving holes formed in both the fan deck housing and the flow director. The hole spacing for the fasteners in all three units are compatible one with the other whereby the deflector can be secured to either end of the evaporator unit.

As illustrated in FIG. 2, a grill 59 is also secured over the air inlet face of the fan deck housing. The grill is secured in place by means of threaded fasteners 57—57. Again the hole spacing for the threaded fasteners is compatible with the other section of the unit. Accordingly, as will be explained in greater detail below, the evaporator coil can be interchangeably secured to either the air entrance face or the air exhaust face of the housing using the threaded fastener means such as noted screws 57—57.

Turning now to FIGS. 2 and 3, the main sections of the present apparatus have been rearranged to reverse the flow of air through the modular unit whereupon incoming air is initially passed into the air director duct 13 and is discharged from the fan deck housing into the container along the top wall 18 thereof. To achieve reversal of the air flow in the front wall arrangement, the fan deck is simply repositioned as shown in the top front corner of the container with the air inlet face of the housing now secured to the evaporator unit. This converts the front wall unit from a blow through configuration to a draw through configuration.

As best seen in FIG. 4, the air outlet openings 30—30 in the exhaust face of the housing extend downwardly from the top wall of the container a distance that is substantially equal to the space 14 that extends from the ceiling of the container to the top of the cargo. Because of the interchangeability of sections, the unit can be quickly and easily converted from a blow through to a draw through configuration with modification. A pair of side rails 60—60 and a bottom rail 61 are secured to the exhaust face of the fan deck housing about the margins of the openings to provide additional support to the housing about the open regions. It should also be noted that in this particular arrangement, the drain pan housed in the flow director continues to collect condensate and carry it out of the unit via drop line 54.

FIGS. 5 and 6 show the sections of the present modular unit mounted in the top front corner of the container along the ceiling thereof. Again, the fan deck housing is mounted in the corner of the container with the air entrance face looking downwardly and the air exhaust face looking rearwardly. The evaporator unit, however, is mounted against the ceiling and fastened to the exhaust face of the fan deck housing. The blowers thus force air through the evaporator coil to provide a blow through configuration. The flow director 13 is secured to the opposite end of the evaporator unit and functions again to direct the conditioned air along the top wall of the container into the noted circulatory flow path 14.

In this ceiling mounted configuration, the front panel of the evaporator unit is removed and replaced with a drip pan 68 which collects condensate falling from the evaporator coil. The collected condensate is passed into a drop line 69 through means of a connector 70 and directed from the unit to an appropriate floor drain.

FIGS. 7 and 8 show the ceiling mounted unit converted to a draw through configuration to provide a down flow of conditioned air along the front wall of the container. Here again, the fan deck housing placement in the container corner is simply turned about so that the air exhaust face now points downwardly and the air entrance face is connected to the evaporator unit. In this configuration, the air director is not required and is replaced with the above noted grill 59.

As should be evident from the disclosure above, the modular apparatus of the present invention, although simple in design, permits an internally mounted air conditioning unit to be quickly and easily installed in a mobile cargo container to facilitate any type of cargo handling application.

While this invention has been described with reference to the details as set forth above, it is not limited to the specific structure as disclosed and the invention is intended to cover any modifications or changes as may come within the scope of the following claims.

We claim:

1. In an enclosed mobile cargo container of rectangular form in which cargo is stacked in close proximity with a horizontally disposed top wall and a vertically disposed front wall of the container to provide horizontal and vertical air passages therebetween through which conditioned air is moved, a modular air conditioning unit for selectively moving air in either a horizontal or vertical direction along said passages that includes a rectangular blower housing having a first pair of closed side walls joined along a first corner which complements the top front corner of a cargo container, and a second pair of open side walls forming a second corner, said open side walls including an entrance wall for admitting air into the housing and an exit wall for discharging air from the housing, a motor driven blower mounted within the housing for drawing air into the housing through the entrance wall and discharging the air through the exit wall, hanger means for interchangeably mounting the housing in the top front corner of the container with the closed walls seated against the top and front container walls whereby the exit wall can be vertically positioned to direct discharge air downwardly adjacent to the front wall of the container or horizontally positioned to direct discharge air rearwardly adjacent to the top wall of the container, an evaporator cabinet containing an evaporator coil, said cabinet including a straight duct having opposed open ends whereby air passing therethrough moves over said coil, fastener means for interchangeably attaching either end of the cabinet to either of the open walls of the housing whereby the blower housing can be operatively connected to the evaporator cabinet to either blow or draw air through the cabinet and the cabinet and housing can be selectively mounted in the top front corner of the container to direct air either along the top wall or the bottom wall of the container, a hollow air duct that is removably attached to one end of the evaporator cabinet which contains a drain means therein for collecting condensate from the evaporator coil and carrying it out of the duct when the cabinet is suspended in a vertical position along the front wall of the container.

2. The modular unit of claim 1, wherein said duct further includes a hollow air director that tapers downwardly from a proximal end to a distal end, said duct having detachable connector means for joining the proximal end of the duct to one end of the evaporator cabinet whereby air from the cabinet is directed into the passage between the cargo and a wall of the container.

3. The modular unit of claim 1 that further includes a drain pan mounted in the evaporator cabinet for collecting condensate from the evaporator coil when the cabinet is horizontally disposed beneath the top wall of the container.

4. The modular unit of claim 1 that further includes a grill means that is capable of being interchangeably mounted over an open wall of the blower housing or an open end of the evaporator cabinet.

* * * * *